United States Patent [19]

Enders

[11] 4,402,783
[45] Sep. 6, 1983

[54] AXIALLY COLLAPSIBLE AND EXPANDABLE TIRE BUILDING DRUM

[75] Inventor: George E. Enders, Salem, Ohio

[73] Assignee: NRM Corporation, Akron, Ohio

[21] Appl. No.: 259,062

[22] Filed: Apr. 30, 1981

[51] Int. Cl.³ .................................. B29H 17/16
[52] U.S. Cl. ............................ 156/415; 156/416
[58] Field of Search ............... 156/415, 416, 417, 401, 156/400, 414

[56] References Cited

U.S. PATENT DOCUMENTS

| | | | |
|---|---|---|---|
| 1,860,342 | 5/1932 | Heston | 156/415 |
| 2,039,531 | 5/1936 | Heston | 156/415 |
| 2,935,117 | 5/1960 | Pfeiffer | 156/415 |
| 3,698,987 | 10/1972 | Woodhall et al. | 156/401 |
| 3,718,520 | 2/1973 | Leblond | 156/416 |
| 3,784,437 | 1/1974 | Appleby et al. | 156/416 |
| 4,011,127 | 3/1977 | Eihholz et al. | 156/401 |
| 4,151,035 | 4/1979 | Jellison | 156/415 |
| 4,214,939 | 7/1980 | Enders | 156/416 |
| 4,244,770 | 1/1981 | Shichman et al. | 156/416 |

*Primary Examiner*—Michael W. Ball
*Attorney, Agent, or Firm*—Maky, Renner, Otto & Boisselle

[57] ABSTRACT

A tire building machine including an axially contractible and expandable drum is characterized by an annularly continuous center deck for the drum having a rigid, axially segmented yet continuous, generally cylindrical deck surface. The center deck includes a center support, end supports, and two symmetrically arranged sets of telescoping rings extending respectively between the center support and opposite end supports. The telescoping rings are axially expandable as the end supports move away from each other to form such rigid, axially continuous deck surface and axially collapsible into or upon one another as the end supports move toward each other. Each ring of the set has flanged ends forming both a stop and an annular sliding bearing surface for the adjacent ring. The rings and their flanges may be precisely formed so that each intermediate ring of the ring set has four annular supporting and sliding surfaces, contributing to the overall rigidity of the deck. Tire components may be applied and firmly stitched directly on the deck surface or an axially elastic sleeve may be employed. The sleeve, secured to each end support, has a substantially cylindrical outer diameter and an inner diameter conforming to the deck surface when axially expanded.

26 Claims, 4 Drawing Figures

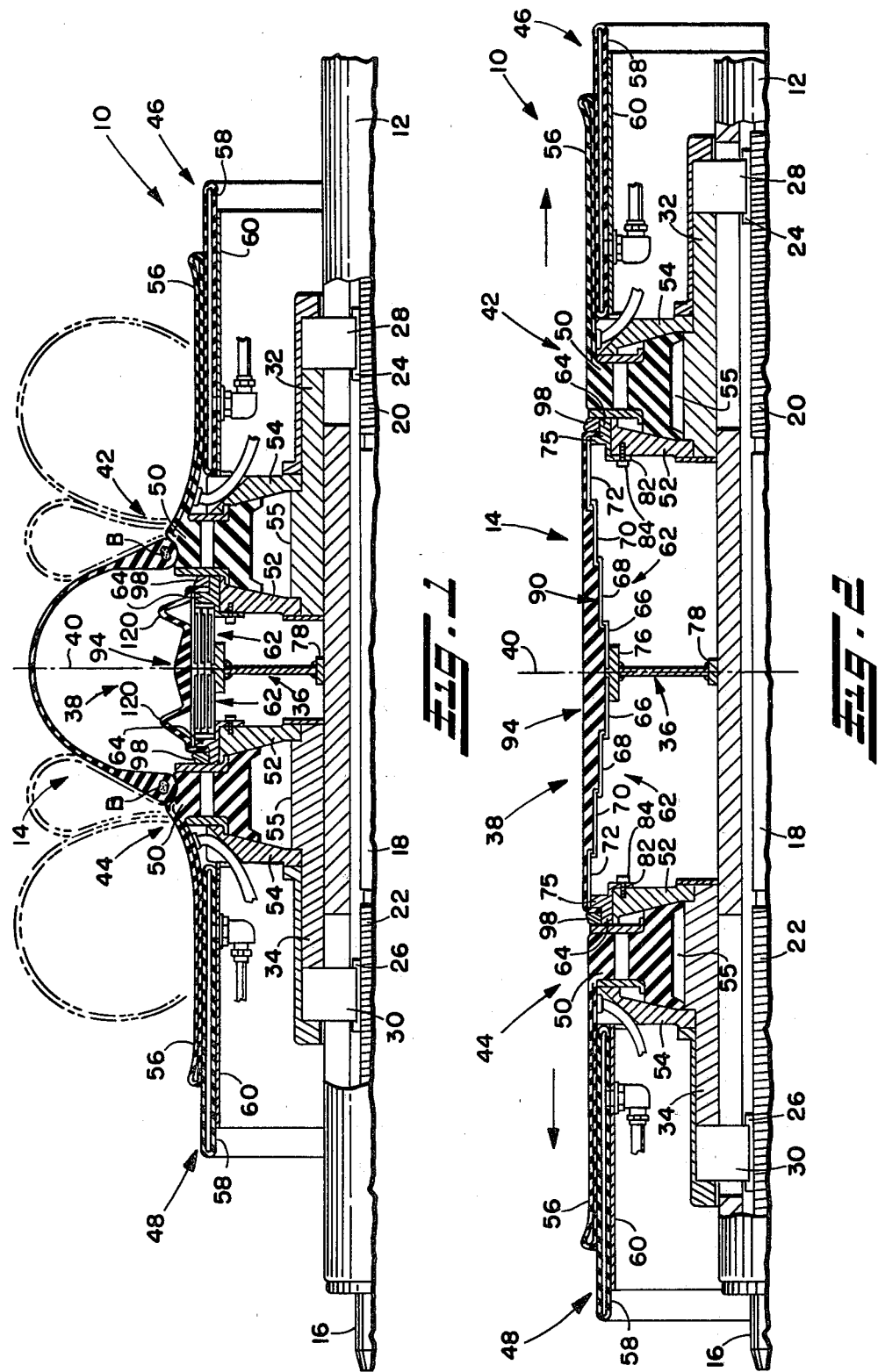

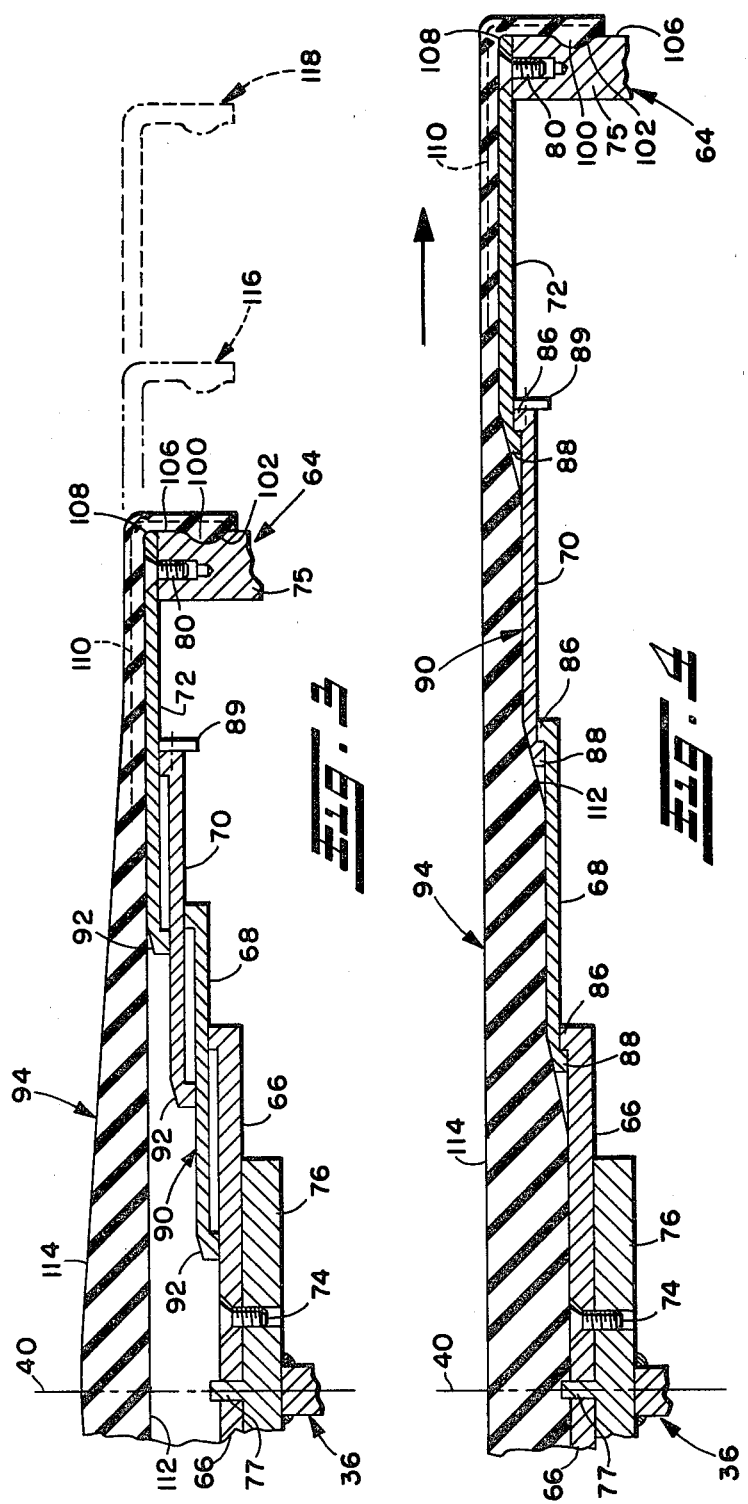

AXIALLY COLLAPSIBLE AND EXPANDABLE TIRE BUILDING DRUM

This invention relates generally, as indicated, to a tire building machine, and more particularly to an axially contractible and expandable drum for a single-stage tire building machine.

BACKGROUND OF THE INVENTION

In the building of a tire on a single-stage tire building machine, a cylindrical carcass is formed by applying one or more plies of tire fabric to a tire building drum. Tire beads thereafter are positioned in proper relation to the cylindrical carcass and properly locked in place, such as by radially expandable bead locks located at each end of the drum, for subsequent wrapping of the tire components thereabout. For final application of tire components, such as a belt and tread assembly, the cylindrical carcass is expanded or converted to toroidal or tire shape. As the tire is converted, the bead locks move uniformly toward each other.

During the aforementioned formation of the cylindrical carcass, the fabric plies desirably are firmly stitched together as they are applied to the drum. Further, particularly when constructing larger and more complex tires, it is desirable to apply other tire components such as chafers, body plies, or belt cushions, which also desirably should be firmly stitched. To obtain firm stitching of tire components, there should be a center deck between the bead locks which is substantially rigid throughout its axial length, of substantially uniform diameter, and yet which will axially contract or collaspse as the tire is brought or converted to its toroidal shape. For the construction of large tires, the distance between the initial bead placement and the final bead position in tire shape can be substantial.

Tire building machines which include an axially contractible and expandable center deck have been employed in tire construction. Some known axially contractible center decks employ an inflatable membrane, such as seen in Eicholz et al U.S. Pat. No. 4,011,127. While readily contractible during conversion of the tire to its toroidal shape, such membranes alone lack the desired rigidity to allow rapid and firm stitching to adhere the tire components to one another.

Other known axially contractible center decks have interfitting rigid parts or segments, such as seen in Benns U.S. Patent 3,526,561. However, such decks when expanded have gaps or spaces between the interfitting rigid deck parts or segments. Accordingly, such decks do not provide a rigid, axially continuous support for the tire components. As seen in the Benns patent, an elastic sleeve may surround the interfitting rigid deck segments. Of course, this still does not provide a rigid, axially continuous support for the tire components in that the elastic sleeve is not rigidly supported in the regions overlying the gaps. For another patent showing an axially contractible center deck employing interfitting rigid parts or fingers, reference may be had to Enders U.S. Pat. No. 4,214,939.

Another problem with some center decks employing rigid parts or segments is that they require complicated mechanisms for expanding and contracting the deck, and further some are capable of providing a generally cylindrical deck surface for tire component application only when in its fully expanded position. Such decks are expensive to manufacture, difficult to maintain, and/or require replacement of the deck segments or parts, or adjustment thereof, when making tires of different widths or bead sets. Examples of center decks having one or more of these deficiencies can be seen in Leblond U.S. Pat. No. 3,718,520 and Appleby et al U.S. Pat. No. 3,784,437.

Some known decks, however, do remain generally cylindrical as they are axially expanded and contracted, such as seen in Woodhall et al U.S. Pat. No. 3,698,987 and the aforementioned Benns patent. However, such decks can at best be expanded twice their fully contracted or collapsed lengths without additional gaps occurring between the relatively axially moving parts or segments thereof. Accordingly, the range of axial working lengths for any given diameter deck is limited.

SUMMARY OF THE INVENTION

According to the present invention, an axially expandable and contractible drum for a single-stage tire building machine includes a center deck having a rigid, axially continuous, generally cylindrical deck surface which provides for firm and rapid stitching thereon of tire components. The center deck, which may be positioned between radially expanding bead locks, is readily collapsible to a small fraction of its fully expanded length, and yet may be expanded to an infinite number of axial working lengths between its fully collapsed and expanded positions for use in constructing tires of different widths or beads sets. Moreover, the center deck, consisting of few parts, is light weight and inexpensive to manufacture.

The center deck according to the invention includes a pair of end supports movable towards and away from each other to expand and contract the deck axially, and a plurality of axially telescoping, circumferentially continuous rings extending axially between the end supports. The telescoping rings are expandable as the end supports move away from each other to form the rigid, axially continuous, generally cylindrical deck surface, and collapsible into or upon one another as the end supports move toward each other.

In a preferred form of center deck, the telescoping rings include a small diameter center ring or rings and symmetrically arranged, progressively larger diameter intermediate and end rings, which preferably are arranged in two symmetrical sets that extend from a center deck support to the respective end supports. Alternatively, the center ring or rings may be the largest diameter ring or rings with each axial outwardly adjacent ring telescoping within the axial inner adjacent ring. Each ring of the set has flanged ends forming both a stop and an annular sliding bearing surface for the adjacent ring. The rings and their flanges may be precisely formed so that each intermediate ring of the ring set has four annular supporting and sliding surfaces, contributing to the overall rigidity of the deck. Further, there may be provided an axially elastic sleeve that surrounds the telescoping rings and is secured at its ends to the end supports. A preferred form of sleeve has a substantially cylindrical outer diameter and an inner diameter substantially conforming to the deck surface, when axially expanded.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a fragmentary half section of a single-stage tire building machine in accordance with the present invention, with the tire carcass expanded to a toroidal shape and the center deck fully collapsed;

FIG. 2 is a view similar to FIG. 1, but with the tire carcass removed and the deck fully expanded;

FIG. 3 is an enlarged fragmentary diametral section of the righthand side of the center deck of FIGS. 1 and 2, with the deck shown in solid and broken lines in several partially expanded positions; and FIG. 4 is a view similar to FIG. 3 showing the center deck in its fully expanded position.

DETAILED DESCRIPTION

I. General Arrangement—Tire Building Machine 10

Referring now in detail to the drawings and initially to FIGS. 1 and 2, the tire building machine indicated generally at 10 can be seen to comprise a main drive shaft 12 for supporting thereon a drum and shaper assembly designated generally by reference numeral 14. The main shaft 12 at its inboard end at the right in such figures may be mounted and driven for rotation in conventional manner. The outboard end of the main shaft as seen at the left in such figures is provided with a pilot nose 16 which may be supported in a retractable tail stock, or preferably by a carrier of the type shown in Enders U.S. Pat. No. 4,230,517.

The main shaft 20 can be seen to be tubular and has journaled therewithin a screw shaft 18 which may be rotated together with or independently of the main shaft as required. The screw shaft 18 is provided with inboard and outboard threaded sections 20 and 22 which respectively are in mesh with nuts 24 and 26. The nuts 24 and 26 respectively have keys 28 and 30 projecting through slots in the main shaft, and such keys at their radially outer end are connected respectively to inboard and outboard sleeves 32 and 34 which ride or slide axially on the exterior of the main shaft.

With the exception of the center support 36 of the center deck shown generally at 38 and described hereinafter in detail, the major components of the drum 14 are supported on the sleeves 32 and 34 for axial sliding movement uniformly toward and away from the transverse center line of the tire building machine, such transverse center line being identified by reference numeral 40. The other or axial center line of the machine is the axis of the main shaft 12, and accordingly the sleeves 32 and 34. For precision in tire construction, the components of the tire must be assembled with proper symmetry and squareness with respect to both center lines.

In addition to the center deck 38, the other major components of the tire building machine 10 are the inboard and outboard bead lock assemblies seen generally at 42 and 44, and the inboard and outboard dual bladder assemblies seen generally at 46 and 48. Other than minor variations, the respective inboard and outboard assemblies are identical but reversely oriented. For ease in description and identification, like reference numerals will be used hereinafter to identify like corresponding elements of such assemblies.

The construction of the inboard and outboard bead lock assemblies 42 and 44 need only be briefly described since they are substantially similar to those shown and described in Shichman U.S. Pat. No. 4,244,770. It can be seen that each bead lock assembly 42, 44 includes a relatively large rubber band or ring 50 which is supported for radial movement between inner and outer flanges 52 and 54 secured to the coresonding sleeves 32, 34. The inner part of each band 50 closes the outer end of the annular chamber 55 formed by the flanges 52 and 54, and air may be supplied through suitable passages in the manner shown in the aforenoted U.S. Pat. No. 4,244,770. Air pressure acting on the underside of the band urges it radially outwardly precisely to center and lock a tire bead B as illustrated in FIG. 1.

The construction of the inboard and outboard dual bladder assemblies 46 and 48 also need only be briefly described since they are substantially similar to those shown and described in copending application Ser. No. 170,021, entitled "The Building Machine", filed July 18, 1980, now U.S. Pat. No. 4,343,671. It can be seen that each dual bladder assembly 46, 48 includes an outer bladder 56 which may be formed integrally with the outer part of the band 50 of the corresponding bead lock assembly 42, 44. Each dual bladder assembly also includes a radially inner bladder 58. When deflated as seen in full lines in FIGS. 1 and 2, the outer bladder 56 lays over the inner bladder 58 and both are supported in such condition in a cylindrical fashion by a cylindrical can or extension 60 mounted on the outer flange 54. The bladders may be inflated to the position shown in broken lines in FIG. 1 to effect folding of the tire components about the tire bead B, all of which is described in detail in the aforementioned application Ser. No. 170,021.

II. Center Deck 38

Still referring to FIGS. 1 and 2, the center deck 38 of the drum 14 can be seen to include, in addition to the center support 36, a plurality of axially telescoping rings which are arranged in two sets commonly designated by reference numeral 62 on opposite sides of the transverse center line 40. Each ring set 62 extends axially between the center support 36 and respective annular end supports or hubs commonly designated by reference numeral 64. When fully collapsed or expanded, the rings of each set will be in symmetry with those of the other set as seen in FIGS. 1 and 2, respectively, but will not necessarily remain so in axial telescoping movement.

Referring now additionally to FIGS. 3 and 4, each ring set 62 includes a center ring 66, intermediate rings 68 and 70, and an end ring 72, all of which are centered on the axial center line of the machine 10. Such rings preferably are circumferentially continuous and progressively increase in diameter from the center ring 66 to the end ring 72.

The center ring 66 of each ring set 62 is supported on and secured by fasteners 74 to opposite axial ends of the outer annular flange 76 of the center support 36. A short radial locating flange 77 may be provided centrally on the outer flange 76 for proper positioning of the center rings 66 and innermost intermediate rings 68 on the outer flange. The radially inner annular flange 78 of the center support, which center support is circular and has the cross-sectional shape of an I, is supported on the exterior of the main shaft 12 for rotation therewith, as seen in FIGS. 1 and 2.

The intermediate and end rings 68, 70 and 72 of each ring set 62 are telescoped over the corresponding center ring 66, each such ring riding or sliding on the next adjacent smaller ring. The end ring 72, which slides on the outermost intermediate ring 70, is supported on and secured by fasteners 80 to a radially outwardly directed annular flange 75 of the corresponding annular end support 64.

Each end support 64 is supported on the outside diameter of inner flange 52 of the corresponding bead lock 42, 44 and is formed with a radially inwardly directed flange or wall 82 overlying the axially inner face of the inner flange 52. Suitable fasteners 84 extending through such wall or flange secure the end support to the inner flange. Accordingly, the end supports will move axially with the bead locks 42, 44 as they move toward and away from each other to collapse and expand the drum 14.

To maintain the rings of each ring set 62 in telescopic relationship during expansion thereof, and to effect such telescopic expansion thereof when the end supports 64 are moved along with the respective bead locks 42, 44 away from each other, the stationary center ring 66 and movable intermediate rings 68 and 70 each have at their axially outer ends a small radially outwardly directed peripheral stop or flange commonly designated by reference numeral 86, whereas the intermediate rings 68 and 70 and end ring 72 at their axially inner ends have a small radially inwardly directed peripheral stop or flange commonly designated by reference numeral 88. The inner diameter of each inwardly directed flange 88 closely slides or rides on the outer diameter of the next innermost or smaller diameter ring, whereas the outer diameter of each outwardly directed flange 86 closely slides or rides on the inner diameter of the next outermost or larger diameter ring. The rings and flanges may be precisely formed within a diameter tolerance of about 0.10 mm. Accordingly, as the center deck 38 is axially expanded, the axially opposed stops or flanges 86, 88 at the axially opposite ends of adjacent rings will engage with each other to maintain such adjacent rings in telescopic relationship, and further to effect telescopic expansion of the rings as the end supports move apart, each ring being pulled axially outwardly by the next larger diameter ring.

Accordingly, each ring of the set has flanged ends forming both a stop and an annular sliding bearing surface for the adjacent ring. The rings and their flanges may be precisely formed so that each intermediate ring of the ring set has four annular supporting and sliding surfaces, contributing to the overall rigidity of the deck.

It will be appreciated that each ring set 62 can be readily assembled by slipping the progressively larger diameter intermediate and end rings 68, 70, 72 over the center rings 66. Thereafter, the center and end rings of each set can be affixed respectively to the center support 36 and respective end support 64. In addition, one or more stops or lugs 89 can be affixed to the axial outer end of each outermost intermediate ring 70 to project radially inwardly therefrom and prevent such rings 70 from overriding the corresponding innermost intermediate rings 68. Although two separate center rings 66 are provided for such ease in assembly, of course a single center ring could be used. In any event, the center rings 66, both being fixed to the center support, collectively can be considered a common stationary center ring having the combined axial length of such center rings 66.

The rings of each ring set 62 preferably all have about the same axial length. Accordingly, the axial length of the center deck 38 when fully collapsed as seen in FIG. 1 will be equal to about twice the axial length of any one ring, or about the combined axial length of the two stationary center rings 66. On the other hand, the center deck may be expanded to many multiples of such fully collapsed length, depending on the number of intermediate rings employed. For each intermediate ring employed in each set, the center deck is expandable an additional multiple of its fully collapsed length.

Whether fully collapsed, partially expanded or fully expanded, the telescoping rings of the center deck 38 form a rigid, axially continuous deck surface 90 for the application and stitching of tire components thereon. Accordingly, a wide range of axial lengths of the deck is provided for building tires of wide ranging size. For a smoothly contoured deck surface, the axially inner corners of the intermediate rings 68, 70 and end rings 72 may be chamfered as seen at 92 in FIG. 4, or otherwise relieved, to provide a smooth transition from each such ring to the next innermost ring.

As best seen in FIG. 2, such deck surface 90, while generally cylindrical, has a slightly negative crown or hour-glass shape when expanded because the rings progressively increase in diameter from the center of the deck to the ends thereof. For some tire building operations, it can be appreciated that the tire components can be applied directly to the deck surface 90. However, many manufacturers desire a cylindrical or slightly positively crowned deck surface for tire building operations. By making the center ring the largest diameter ring and with each axial outwardly adjacent ring telescoping within the axial inner adjacent ring, a deck with a slightly positive crown is formed. Alternatively for a positive crown or flat drum the axially elastic sleeve 94 is provided.

III. Sleeve 94

As seen in FIGS. 1 and 2, the axially elastic sleeve 94 is clamped at its ends to the radially outwardly directed flanges 74 of the end supports 64 by transition rings 98. Preferably, the sleeve has an annular bead 100 at each end which is received in a suitable circumferential continuous groove 102 in the axially outward face 106 of the flange 74, as seen in FIGS. 3 and 4. This provides positive locking or anchoring of the ends of the sleeve to the end supports 64 by the transition rings 98. Preferably, the exterior of each transition ring is conical to provide a relatively smooth transition surface between the sleeve 94 and the bead locks 42, 44 in their retracted condition as seen in FIG. 2.

In FIG. 3, the sleeve 94 is shown in full lines in its molded or axially unstretched condition. It can be seen that the sleeve is thickest in the center and gradually decreases in thickness or tapers to each end. The sleeve can be seen to taper to a point about $\frac{1}{3}$ the axial length of the end ring 72 from the axially outer end or shoulder 108. The end or marginal portion of the sleeve preferably includes axial cord reinforcement 110 which extends from the end of the sleeve to just within the tapered portion.

In its unstretched or molded condition seen in full lines in FIG. 3, the inner diameter 112 of the sleeve 94 is generally cylindrical while the outer diameter 114 is generally convex. As the elastic sleeve is stretched axially as the end supports 64 move apart to expand the center deck 32, the middle or tapered portion of the sleeve will be pulled downwardly, i.e. radially inwardly, against the deck surface 90. As seen in FIG. 4, the inner diameter 112 of the sleeve will engage and conform to the contour of the deck surface 90 whereas the outside diameter 114 of the sleeve will become substantially cylindrical, or slightly positively crowned if desired. Accordingly, the outside diameter 114 of the sleeve provides the desired substantially cylindrical deck surface on which tire components can be applied and stitched, it of course being appreciated that the sleeve is fully rigidly supported by the rigid deck surface 90. Such desirably will be the case over the entire working range of the center deck, an exemplary minimum working length being indicated in broken lines at 116 in FIG. 3, and another or maximum working length being indicated in broken lines at 118. When the deck is fully collapsed, the sleeve will tend to fold upon itself, such fold occurring primarily at the thinner inner end portions as indicated at 120 in FIG. 1. Both the deck and sleeve may be appropriately perforated so that air pressure may be used within the tire carcass to assist in bringing it to the tire shape shown in FIG. 1 as the beads move together.

It now can be appreciated that there is provided an axially collapsible and expandable center deck for a tire building machine on which tire building components can be applied and firmly stitched. Whether the components are applied directly to the deck surface 90, such as for "negative crown" tire building, or to the elastic sleeve 94, the center deck provides a rigid, axially continuous support surface for the tire components. After the tire components have been applied and stitched together, and the beads positioned and supported by the bead locks, the center deck is readily collapsible as the bead locks are moved together to bring the tire carcass to its toroidal shape for subsequent application of the tread and belt assemblies.

It further can be appreciated that the center deck is expandable to an infinite number of working lengths over a wide range between its fully expanded and contracted positions. Accordingly, tires of different bead sets can be made without expensive and time consuming adjustments and part changes.

Although the invention has been shown and described with respect to a preferred embodiment, it is obvious that equivalent alterations and modifications will occur to others skilled in the art upon the reading and understanding of the specification. The present invention includes all such equivalent alterations and modifications, and is limited only by the scope of the following claims.

I claim:

1. In a tire building machine including an axially contractible and expandable drum, the improvement comprising a center deck for the drum having a rigid, axially continuous, generally cylindrical deck surface, said deck comprising end supports movable toward and away from each other to collapse and expand the deck axially, and at least five axially telescoping, circumferentially continuous rings extending axially between said end supports, said telescoping rings being expandable as said end supports move away from each other to form such rigid, axially continuous, generally cylindrical deck surface and collapsible into or upon one another as said end supports move together.

2. The machine of claim 1 wherein said telescoping rings include a small diameter center ring and symmetrically arranged, progressively larger diameter intermediate and end rings.

3. The machine of claim 2 further comprising a center support for said center ring.

4. The machine of claim 3 wherein said intermediate and end rings are about equal in axial length, and said center ring is about twice the length of each intermediate and end ring.

5. The machine of claim 3 wherein adjacent rings have at their axially opposite ends axially opposed stops engageable with each other to maintain adjacent rings in telescopic relationship upon expansion thereof.

6. The machine of claim 5 wherein said opposed stops include small, oppositely directed radial flanges respectively at axially opposite ends of adjacent rings.

7. The machine of claim 6 wherein the radial flanges on said intermediate and end rings at their axially inner ends extend radially inwardly and closely ride on the outside diameter of the next adjacent smaller diameter ring, and the radial flanges on said center and intermediate rings at their axially outer ends extend radially outwardly and closely ride on the inner diameter of the next larger diameter ring.

8. The machine of claim 1 wherein each intermediate ring has at least four annular and supporting sliding surfaces.

9. The machine of claim 3 wherein the axially inner end of each intermediate and end ring is chamfered.

10. The machine of claim 4 further comprising an axially elastic sleeve surrounding said telescoping rings and secured to each end support.

11. The machine of claim 10 wherein said sleeve decreases in thickness from its center to its ends.

12. The machine of claim 10 wherein said sleeve has a substantially cylindrical outer diameter and an inner diameter conforming to such deck surface, when axially expanded.

13. The machine of claim 12 wherein said sleeve is axially reinforced at its ends.

14. The machine of claim 1 wherein said telescoping rings include symmetrically arranged center, intermediate and end rings.

15. The machine of claim 14 wherein adjacent rings have at their axially opposite ends axially opposed stops engageable with each other to maintain adjacent rings in telescopic relationship upon expansion thereof.

16. The machine of claim 14 further comprising an axially elastic sleeve surrounding said telescoping rings and secured to each end support.

17. The machine of claim 16 wherein said sleeve has a substantially cylindrical outer diameter and an inner diameter conforming to such deck surface, when axially expanded.

18. In a tire building machine including an axially contractible and expandable drum, the improvement comprising a center deck for the drum having a rigid, axially continuous center deck surface, said center deck comprising end supports, a center support, and a pair of symmetrically arranged sets of at least three circumferentially continuous telescoping rings respectively extending between said center support and said end supports.

19. In a tire building machine including an axially contractible and expandable drum, the improvement comprising a center deck for the drum having a rigid, axially continuous center deck, said center deck comprising end supports, a center support, and a pair of symmetrically arranged sets of telescoping rings respectively extending between said center support and said end supports, each set including a center ring supported on and secured to said center support, an end ring supported on and secured to the corresponding one of said end supports, and at least one intermediate ring interconnected between said center and end rings.

20. The machine of claim 19 wherein the rings of each set progressively increase in diameter from said center ring to said end ring.

21. The machine of claim 20 wherein adjacent rings have at their axially opposite ends axially opposed stops engageable with each other to maintain adjacent rings in telescopic relationship upon expansion thereof.

22. The machine of claim 20 further comprising an axially elastic sleeve surrounding said telescoping rings and secured to each end support.

23. The machine of claim 22 wherein said sleeve decreases in thickness from its center to its ends.

24. The machine of claim 22 wherein said sleeve has a substantially cylindrical outer diameter and an inner diameter conforming to such deck surface when axially expanded.

25. In a tire building machine including an axially expandable and contractible drum, the improvement comprising a center deck including end supports movable axially toward and away from each other to collapse and expand said center deck, a plurality of circumferentially continuous axially telescoping rings extending axially between said end supports, said rings being expandable as said end supports move away from each other to form a rigid, axially continuous, generally cylindrical deck surface which is crowned and collapsible into or upon one another as said end supports move towards each other, and an axially elastic sleeve for said telescoping rings secured to said end supports, said sleeve being of non-uniform thickness and having a substantially cylindrical outer diameter and a contoured inner diameter conforming to the crowned deck surface across the full width thereof, when axially expanded.

26. The machine of claim 25 further comprising radially expanding bead locks at each end of the center deck, each including a continuous elastomeric band confined between axially inner and outer flanges, and means to move said bead locks axially towards and away from each other, and wherein each end support includes an annular hub secured to respective ones of said inner flanges of said bead locks.

* * * * *